United States Patent
Zolfaghari et al.

(10) Patent No.: US 12,540,880 B2
(45) Date of Patent: Feb. 3, 2026

(54) ELECTRIFIED SEALING AND ANTI-EXTRUSION ELEMENTS FOR SYSTEM HEALTH MONITORING

(71) Applicant: Schlumberger Technology Corporation, Sugar Land, TX (US)

(72) Inventors: Alireza Zolfaghari, Sugar Land, TX (US); Manuel Marya, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 529 days.

(21) Appl. No.: 18/152,395

(22) Filed: Jan. 10, 2023

(65) Prior Publication Data

US 2024/0230465 A1    Jul. 11, 2024

(51) Int. Cl.
| | |
|---|---|
| *G01M 13/005* | (2019.01) |
| *E21B 33/10* | (2006.01) |
| *F16J 15/3284* | (2016.01) |
| *G01M 5/00* | (2006.01) |

(52) U.S. Cl.
CPC ....... *G01M 13/005* (2013.01); *F16J 15/3284* (2013.01); *G01M 5/0041* (2013.01); *G01M 5/0091* (2013.01); *E21B 33/10* (2013.01)

(58) Field of Classification Search
CPC ............. G01M 13/005; G01M 5/0041; G01M 5/0091; F16J 15/3284; E21B 33/10
See application file for complete search history.

(56) References Cited

U.S. PATENT DOCUMENTS

| | | | |
|---|---|---|---|
| 8,882,872 B2 | 11/2014 | Mazyar | |
| 2008/0236271 A1* | 10/2008 | Zhang | E21B 33/124 |
| | | | 73/152.48 |
| 2010/0108403 A1 | 5/2010 | Keshavan | |
| 2012/0312560 A1* | 12/2012 | Bahr | E21B 33/1208 |
| | | | 166/387 |
| 2018/0320513 A1 | 11/2018 | Scott et al. | |
| 2021/0140265 A1* | 5/2021 | Mitchell | E21B 33/1216 |
| 2024/0049385 A1 | 2/2024 | Zolfaghari | |

FOREIGN PATENT DOCUMENTS

| | | |
|---|---|---|
| CN | 114665114 A | 6/2022 |
| KR | 20200144652 A | 12/2020 |
| WO | 2021089564 A1 | 5/2021 |

OTHER PUBLICATIONS

Anonymous, Dual Packer Module with Load Sensor, IP.com No. IPCOM000188442D, Oct. 7, 2009 (Year: 2009).*

(Continued)

*Primary Examiner* — Daniel R Miller
(74) *Attorney, Agent, or Firm* — Jeffrey D. Frantz

(57) ABSTRACT

A system may include a fluid sealing component having a body comprising a carbon-rich material comprising a non-conductive carbon region. The carbon-rich material includes one or more treated carbon regions. The one or more treated carbon regions include an electrically conductive material. A sheet electrical resistance of the one or more treated carbon regions is less than a sheet electrical resistance of the non-conductive carbon region.

20 Claims, 7 Drawing Sheets

(56) References Cited

OTHER PUBLICATIONS

Ventura, Darryl , Dolog, Rostyslav , Darugar, Qusai , Khabashesku, Valery , and Baker Hughes. "Nano-Enabled Smart Materials and Sensors for Oil and Gas Applications." Paper presented at the Abu Dhabi International Petroleum Exhibition & Conference, Abu Dhabi, UAE, Nov. 2017 (Year: 2017).*

PEK Overview, available at https://drakeplastics.com/ultra-high-performance-plastic-materials-solutions-for-your-most-demanding-applications/pek-polyetherketone/ on May 26, 2022 (Year: 2022).*

PEEK Overview, available at https://drakeplastics.com/ultra-high-performance-plastic-materials-solutions-for-your-most-demanding-applications/peek-polyetheretherketone/ on May 26, 2022 (Year: 2022).*

PAEK Overview, available at https://drakeplastics.com/ultra-high-performance-plastic-materials-solutions-for-your-most-demanding-applications/polyaryletherketone-paek/ on May 26, 2022 (Year: 2022).*

PPS Overview, available at https://drakeplastics.com/ultra-high-performance-plastic-materials-solutions-for-your-most-demanding-applications/polyphenylene-sulfide-pps/ on May 26, 2022 (Year: 2022).*

International Search Report and the Written Opinion issued in the PCT Application No. PCT/US2023/029681 dated Nov. 24, 2023, 12 pages.

Zivelonghi et al., "Laser decoating of DLC films for tribological applications," Int J Adv Manuf Technol, vol. 93, p. 1715, 2017. (10 pages).

Radek et al., "Influence of laser texturing on tribological properties of DLC coatings," Production Engineering Archives , vol. 27, No. 2, pp. 119-123, 2021.

Dumitru et al., "Laser treatment of tribological DLC films," Diamond and Related Materials, vol. 12, p. 1034-1040, 2003.

Nister et al., "Direct Observation of Laser-Induced Crystallization of a-C: H Films," Appl. Phys. A, vol. 58, pp. 137-144, 1994.

Tao et al., "An intelligent artificial throat with sound-sensing ability based on laser induced graphene," Nature Communications, vol. 8, p. 14579, 2017 (8 pages).

Tao et al., "A Flexible 360-Degree Thermal Sound Source Based on Laser Induced Graphene.," Nanomaterials, vol. 6, pp. 1-8, 2016.

Zhang et al., "Monolithic and Flexible ZnS/SnO2 Ultraviolet Photodetectors with Lateral Graphene Electrodes," Small, vol. 13, No. 18, p. 1604197, 2017 (7 pages).

Rahimi et al., "Highly Stretchable and Sensitive Unidirectional Strain Sensor via Laser Carbonization," ACS Appl. Mater. Interfaces, vol. 8, p. 4463-4470, 2015.

Vanegas et al., "Laser Scribed Graphene Biosensor for Detection of Biogenic Amines in Food Samples Using Locally Sourced Materials," Biosensors, vol. 8, No. 2, p. 42, 2018. (19 pages).

Nayak et al., "Highly Efficient Laser Scribed Graphene Electrodes for On-Chip Electrochemical Sensing Applications," Advanced Electronic Materials , vol. 2, No. 10, 2016. (11 pages).

Fenzl et. al., "Laser-Scribed Graphene Electrodes for Aptamer-Based Biosensing," ACS Sensors , vol. 2, No. 5, pp. 616-620 , 2017.

Nag et. al., "Sensing system for salinity testing using laser-induced graphene sensors," Sensors and Actuators A: Physical, vol. 264, pp. 107-116, 2017.

Tan et. al., "Transient laser heating induced hierarchical porous structures from block copolymer-directed self-assembly," Science, vol. 349, No. 6243, p. 54, 2015 (5 pages).

* cited by examiner

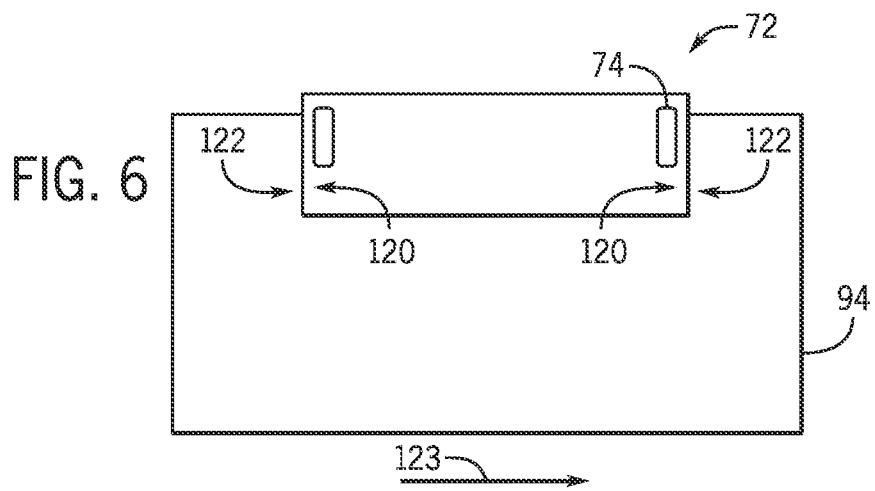
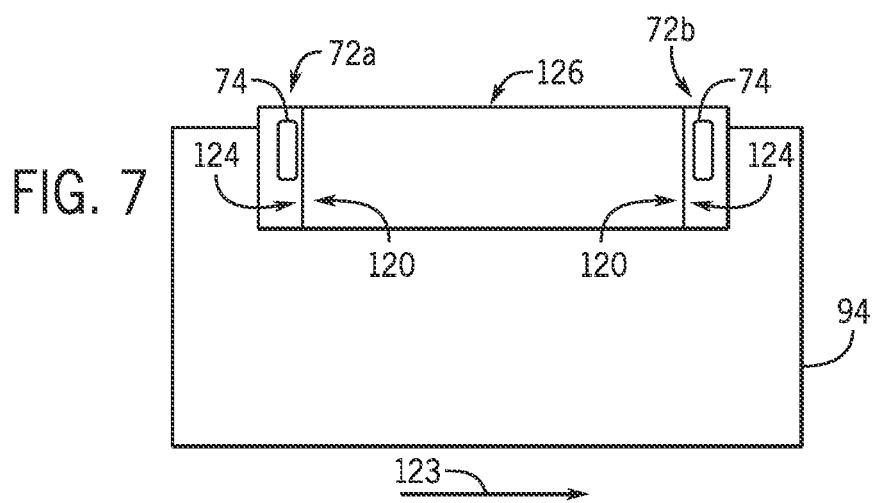
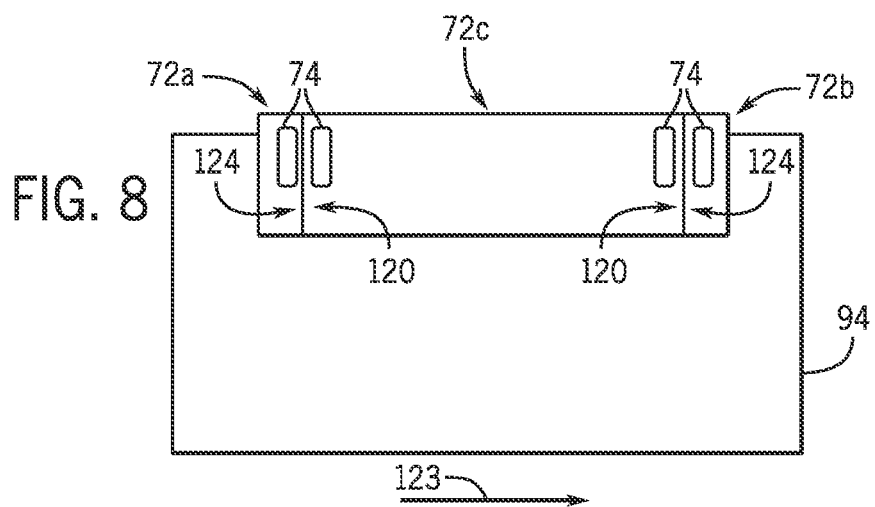

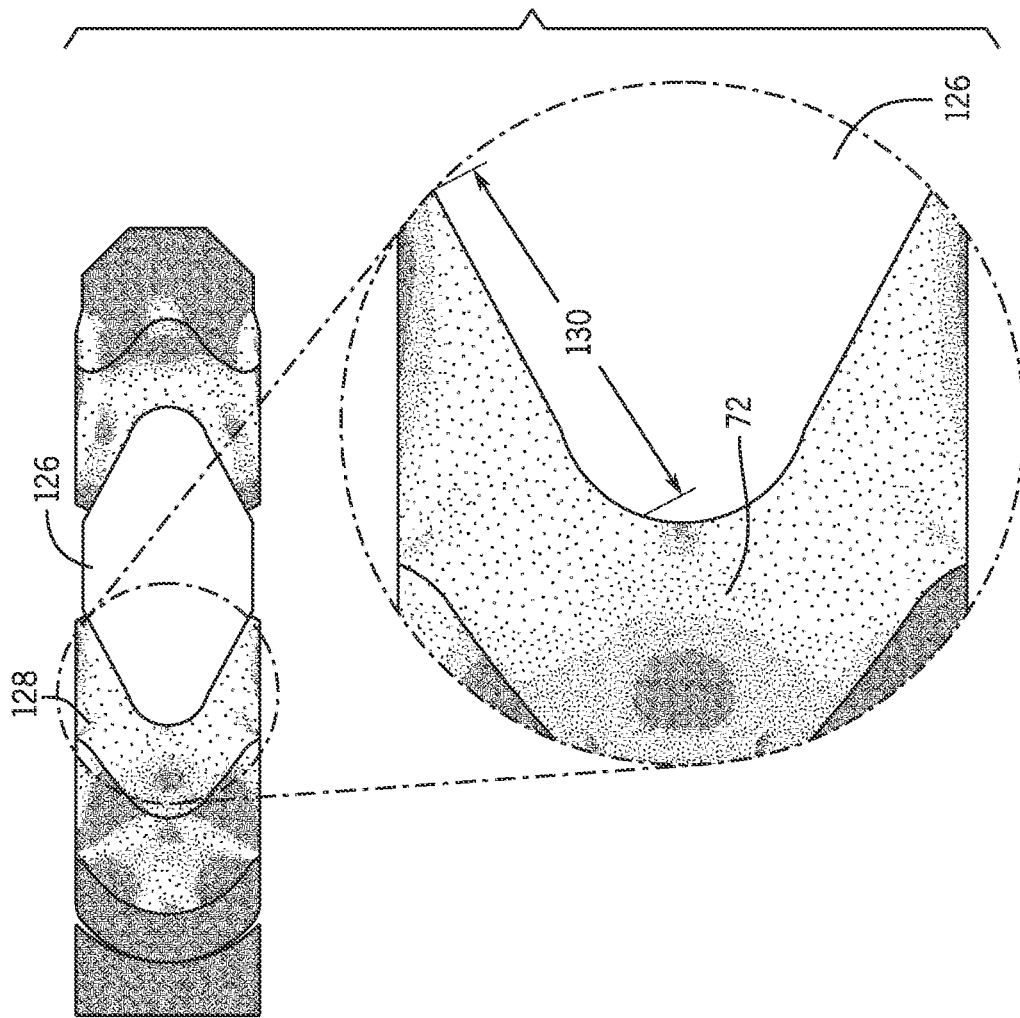

ELECTRIFIED SEALING AND ANTI-EXTRUSION ELEMENTS FOR SYSTEM HEALTH MONITORING

BACKGROUND

The subject matter disclosed herein relates to systems and methods for electrified anti-extrusion elements and/or electrified sealing elements. More specifically, the subject matter disclosed herein relates to anti-extrusion elements and/or sealing elements formed of a carbon-rich material that is treated to form one or more treated carbon regions with greatly different electrical properties than the carbon-rich material (i.e., untreated carbon-rich material). The one or more treated carbon regions enable the assessment of the electrical properties from the one or more treated carbon regions that is correlated to a change in force, stress, pressure, displacement, strain, seal failure, or a combination thereof, of the anti-extrusion element and/or the sealing element.

Fluid system equipment, including sealing elements (e.g., elastomeric O-ring) and complementary anti-extrusion sealing elements (e.g., thermoplastic back-up rings), are generally required to block fluid leakages outside of a desired flow path (e.g., within a fluid conduit) or maintain flow along a particular direction (e.g., within the fluid conduit). Fluid system equipment may be exposed to fluids either directly or indirectly and may be utilized across a variety of fluidic transport applications. These include oil and gas operations, water underground injection, gas and supercritical fluid underground injection including carbon dioxide geological sequestration, hydrogen underground storage, geothermal systems, pipeline flow measurement systems, and specific equipment such as safety valve, lubricator valves, packers, liner hangers, plugs or downhole fluid sampling and analysis systems, among examples. For example, these sealing elements and complementary anti-extrusion elements may be utilized on land or floating infrastructures at normal atmospheric conditions, subsea equipment, deployed underwater under hydrostatic pressure, or downhole equipment used with subterranean reservoirs. For example, hydrocarbon extraction components may include sealing elements to maintain flow of extracted hydrocarbons along a desired flow path, and may be complemented by anti-extrusion elements to support elastomeric elements under pressure differentials. Accordingly, the fluid system equipment may be subjected to a variety of environmental and operational conditions that may result in fluid leakage. For example, operational conditions (e.g., a pressure of a fluid flowing along the desired flow path) having chemical constituents (e.g., hydrogen sulfide, supercritical carbon dioxide, acids, bases, strong solvents, or even corrosion inhibitors) may gradually degrade elastomers and/or anti-extrusion, leading to a loss of fluid-containment capabilities and potentially leakage and failure. In any case, it may be difficult to monitor any gradual changes prior to any potential leakage failures because the sealing elements and if present the anti-extrusion elements may be difficult to access, including positioned between other components (e.g., walls of a conduit) and/or being located deep within a wellbore. Accordingly, it may be highly desirable to deliver sensing capabilities to equipment sealing elements and/or anti-extrusion elements to monitor sealing system for prognostic health monitoring purposes, thus field failure prevention.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, the present disclosure relates to a fluid system. The system includes a fluid sealing component having a body comprised of a carbon-rich polymer that is characterized as electrically non-conductive. The carbon-rich polymer comprises one or more treated carbon regions where the polymer has been superficially transformed to become electrically conductive though the formation of graphene and optionally the addition of a metallic component and is characterized by a sheet electrical resistance less than the sheet electrical resistance of the non-conductive untreated polymer.

In certain embodiments, the present disclosure relates to a fluid system. The system includes a fluid sealing equipment monitoring system that measures data indicative of a change in one or more electrical properties of a carbon-rich material. The system also includes a fluid sealing component having a carbon-rich material. The carbon-rich material comprises one or more treated carbon regions where the carbon-rich material has been superficially transformed to become electrically conductive though the formation of graphene and optionally the addition of a metallic component and is characterized by a sheet electrical resistance less than the sheet electrical resistance of the non-conductive untreated material The one or more treated carbon regions comprise a sheet electrical resistance that is less than a sheet electrical resistance of the untreated carbon-rich material. The system also includes a non-transitory machine-readable medium and executable by a processor to identify the change in an electrical property of the fluid sealing component in response to the data and output an indication of the change.

In certain embodiments, the present disclosure relates to a system. The system includes an annular sealing element having an elastomer material. The system also includes an annular anti-extrusion element having a carbon-rich material, the carbon-rich material having a treated carbon region characterized by a first electrical sheet resistance. The carbon-rich material also includes one or more non-conductive untreated material having a second sheet resistance that is greater than the first electrical sheet resistance.

BRIEF DESCRIPTION OF THE DRAWINGS

Various aspects of this disclosure may be better understood upon reading the following detailed description and upon reference to the drawings in which:

FIG. 6 is a cross-sectional side view of two downhole components sealed with an embodiment of a smart sealing element;

FIG. 7 is a cross-sectional side view of two downhole components sealed with an embodiment of a sealing element coupled to a smart anti-extrusion element;

FIG. 8 is a cross-sectional side view of two downhole components sealing with an embodiment of a smart sealing element and an embodiment of a smart-anti-extrusion element;

FIG. 9 is a cross-sectional side view of an embodiment of smart sealing equipment with estimates of an applied force on an anti-extrusion element by a sealing device;

DETAILED DESCRIPTION OF SPECIFIC EMBODIMENTS

Figure 1:
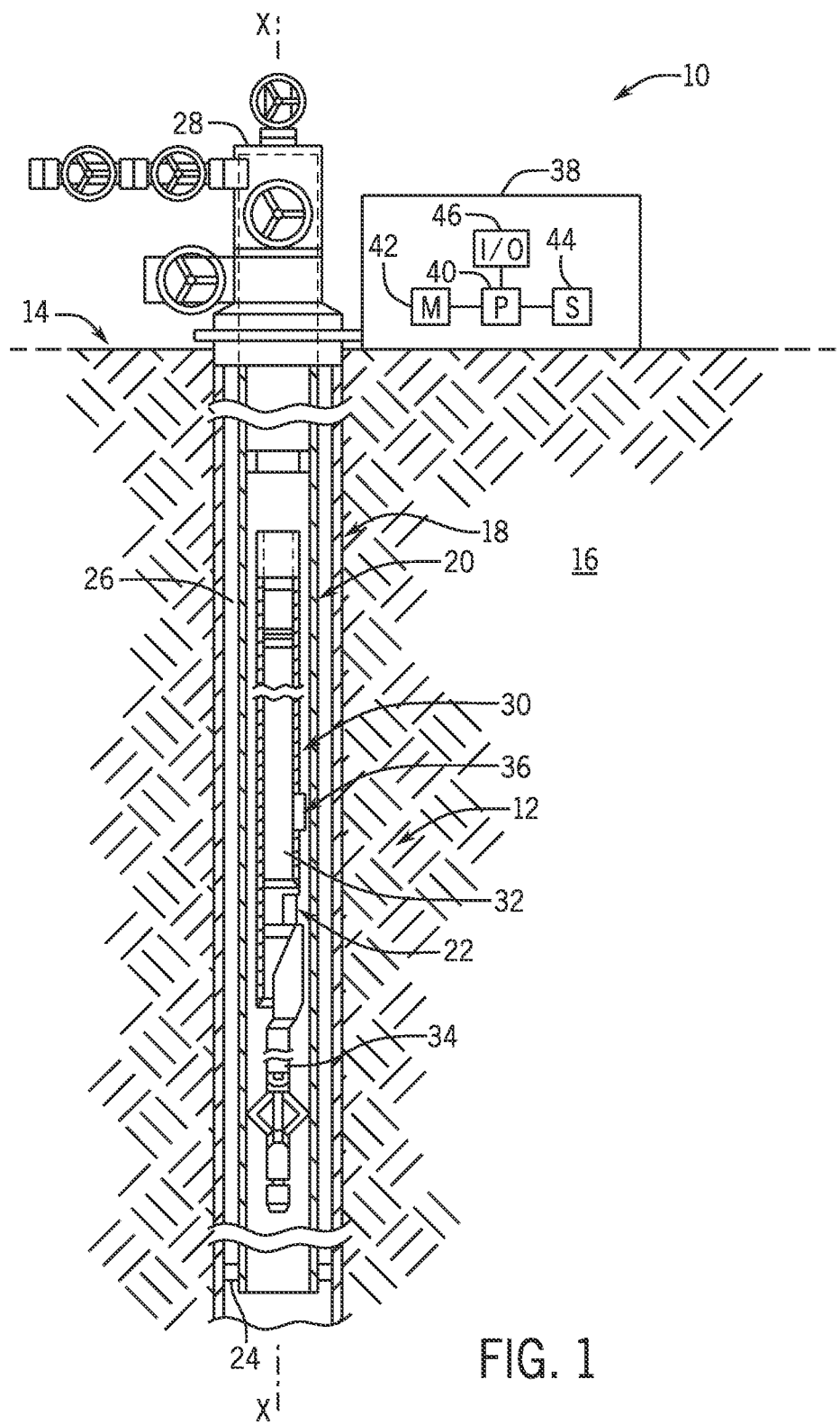
FIG. 1 is a schematic diagram of an embodiment of a wellsite that may include smart sealing equipment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed previously, fluid system equipment generally comprises sealing components such as elastomeric seals and anti-extrusion elements depending upon the sealing system mission profiles, including maximum pressure rating, upper temperature limits, among others. The seals are intended to maintain a fluid flow along a particular direction (e.g., within a conduit formed by two coupled downhole components) and blocks fluid leakage outside of the conduit. As referred to herein, a "sealing element" includes an elastomeric component that energizes to form a seal over a matting surface, such as a seal between two or more downhole components (e.g., an inner wall of a fluid conduit, an anti-extrusion element, and a matting surface). In general, the downhole components are part of tool assemblies including metallic materials that sustain mechanical loads such as tubing axial loads and well pressures in the case of downhole fluid system equipment. In downhole equipment, seals and anti-extrusion elements are found in all valves, packers, and most tubing and liner accessories. Packers are a special type of downhole tools wherein the major function is providing sealing between two zones along a tubing. Packers comprises both large elastomeric seals around a tubular piece, and anti-extrusion rings, aimed at keeping the elastomeric elements constrained for a superior sealing against a matting surface, the latter being the internal surface of a tubular component such as a casing, or an open-hole irregular formation. As a non-limiting example, the sealing element may commonly include an o-ring or annular seal, a non-annular seal, a gasket, a packer element, and other elastomer components that provide sealing. As referred to herein, an "anti-extrusion element" includes a machined component that provides mechanical reinforcement to the sealing element to substantially reduce or block extrusion by counteracting the force resulting from the sealing element expanding due to mechanical or hydraulic forces on sealing element. As referred to herein, extruding or extrusion is a process where a material undergoes deformation by an application of a force that causes the material to flow through a gap (i.e., an extrusion gap) between two materials desired to be sealed together. As a non-limiting example, the anti-extrusion element may be a back-up ring. In any case, a downhole component may include a sealing element with or without an anti-extrusion element to facilitate a sealed coupling or seal interface with another downhole component. In operation, the sealing equipment may be subject to harsh conditions (e.g., pressure, temperature, prolonged fluid flow, harsh chemicals or corrosive fluids, particle-laden fluids, etc.) that may gradually wear down a sealing element to failure. However, as noted above, it may be difficult to assess, monitor, or otherwise determine a condition of the anti-extrusion element and/or sealing elements because the anti-extrusion element and/or sealing element may for example, be disposed in a relatively inaccessible location. As such, an operator may not be able to monitor failure of the sealing element until it has failed.

Accordingly, the present disclosure is directed to techniques for generating and utilizing smart fluid sealing component, such as a smart sealing element and/or a smart anti-extrusion element, by treating a carbon-rich polymer of the smart fluid sealing component to form an electrically conductive region (e.g., having a lower sheet resistance than the untreated carbon-containing material). In some embodiments, treating the carbon-rich polymer may include depositing a conductive material (e.g., a metal) onto the carbon-rich polymer, thereby forming the electrically conductive region having a lower sheet resistance than the carbon-rich polymer. As described in further detail herein, it is presently recognized that it may be advantageous to form the smart fluid sealing component such that the electrically conductive regions are on particular areas, regions, or locations, of a surface of the smart anti-extrusion element and/or the smart sealing element. For example, in an embodiment where the smart anti-extrusion element is used in conjunction with a sealing element (e.g., smart sealing element or non-smart sealing element), it may be advantageous to form the electrically conductive region on an inner surface of the smart-anti-extrusion element. As such, the electrically conductive regions of the smart-anti-extrusion element may impact the sealing element as it expands. As another non-limiting example, where a smart sealing element is used in conjunction with an anti-extrusion element or without an anti-extrusion element, it may be advantageous to form the electrically conductive region on an outer surface of the smart sealing element. Moreover, it is presently recognized that it may be advantageous to form the electrically conductive region on a portion of a surface of the fluid sealing equipment based on the shape of the fluid sealing equipment. Moreover, it is presently recognized that it may be advantageous to form the electrically conductive region along or adjacent to one or more areas of a sealing interface that may be susceptible to operating conditions having chemical constituents that may result in stress, fatigue, erosion, corrosion, or generally wear, damage, and/or leaking, and one or more areas of the sealing interface that form a wedge fit, interference fit, or otherwise high contact forces to maintain a fluid seal. In any case, the expansion or deformation of the sealing element may subject a strain or force onto the electrically conductive regions, which causes a measurable change in the electrical properties of the electrically conductive region. In turn, a processor can determine a condition of the sealing element based on the change in the electrical properties, which may indicate whether a sealing element should be replaced or equipment using the sealing element should halt operation and/or receive maintenance. In this way, the smart fluid sealing components may provide prognostic health monitoring capabilities to fluid systems that may otherwise be difficult to monitor.

With the foregoing in mind, FIG. 1 illustrates a subterranean well system 10 that may utilize the smart fluid sealing component. In some embodiments, the subterranean well system 10 may include a well closure system, a mineral extraction system, and/or a hydrocarbon extraction system. It should be noted that although the discussion of FIG. 1 relates to a well closure system, embodiments of the present disclosure may be utilized in any subsurface application where hydrocarbons are produced and injection systems where liquid water, steam, gases such as carbon dioxide, hydrogen, or other fluids such as supercritical carbon dioxide or mineral-rich brines are sequestered or produced from a surface or subsea. In a well closure system, one or multiple closure devices 12 (e.g., for plugging a well) may be lowered into a wellbore 14 (e.g., installed and anchored within the wellbore 14) prior to certain operations, such as well production. The closure device 12 may be lowered into the wellbore 14 as a first installation, to replace a previously installed closure device 12, or to add an additional closure device 12. In any case, the closure device 12 is configured to control flow from the reservoir such that it goes in at the specific manage points (e.g., perforations, valves, and the like). For example, the closure device 12 may block a flow of formation (reservoir) fluid from reaching a surface location above a geological formation 16 (e.g., via conduits such as a casing conduit 18 and/or a production casing conduit 20), which flow may result from high pressure conditions that arise during well production. The closure device 12 may include a valve 22, such as a subsurface valve. For example, the valve 22 may include a gate valve, a ball valve, a linear piston valve, a check valve, or any combination thereof. In any case, the closure device 12 may include one or more fluid sealing equipment, such as o-rings or annular seals, non-annular seals, gaskets, back up rings, and the like. As shown in this configuration of the wellbore 14, the wellbore completion includes a casing conduit 18 and a production casing conduit 20 (e.g., production tubing) with an annular sealing element 24 (e.g., metal and/or elastomeric seal) having a body with annular structure that seals an annular space 26 defined between the casing conduit 18 and the production casing conduit 20. The wellbore 14 may include a wellhead 28 at the surface of the subterranean well system 10 that may selectively seal the casing conduit 18 and/or the production casing conduit 20.

In the illustrated example of FIG. 1, the closure device 12 includes a valve housing 30 having a valve 22, an actuation subsystem 32 (e.g., an actuator), and a valve controller 34. The closure device 12 is sealed in the production tubing by a sealing element, so that the fluid may not reach the surface if it does not pass through the valve 22. In certain embodiments, the valve 22 may include a gate valve, a ball valve, or another suitable valve configured to open and close the fluid flow. For example, the valve 22 may include a flapper that can switch between an open position to enable fluid flow and a closed position to block the fluid flow. The actuation subsystem 32 may include an electric actuator, a fluid-driven actuator (e.g., a hydraulic actuator), a mechanical actuator (e.g., a hand wheel), a spring biasing element (e.g., a mechanical spring) configured to bias the valve to an open or closed position, or any combination thereof. For example, the actuation subsystem 32 includes a biasing component 36 (e.g., a pressurization piston coupled to a mechanical spring) to maintain the valve 22 in a default position (e.g., open or closed). The valve controller 34 is configured to control and/or adjust a position of components of the closure device 12 (e.g., the valve 22) via the actuation subsystem 32 to block the flow of formation fluid from reaching the surface or to enable the fluid to flow toward the surface. In certain embodiments, the valve 22 and/or one or more additional valves may be used to control fluid flow from the surface to a downhole location, such as by injecting one or more fluids such as water, carbon dioxide, hydrogen, among others.

It should be noted that the actuation subsystem 32 and the valve housing 30 may be configured to operate with or without use of fluid or electrical control lines extending from the surface into the wellbore 14. For example, electrical power and/or fluid pressure may be provided from the surface using one or more electrical generators, a power grid, batteries, pumps, or a combination thereof. Additionally, or alternatively, the actuation subsystem 32 may be powered by one or more local power supplies, such as a battery pack, at the location of the valve 22.

The illustrated embodiment of the closure device 12 includes the valve controller 34 that may be utilized to adjust the position of the components in the valve housing 30. The valve controller 34 controls and/or adjusts a position of the valve 22 between open and closed positions (e.g., via the actuation subsystem 32). For example, the valve controller 34 may control and/or adjust the valve 22 based on control signals and/or messages that are transmitted by a transmitter of a transmitter subsystem 38.

In some embodiments, the transmitter subsystem 38 may receive sensor measurements (e.g., temperature sensor measurements, pressure sensor measurements, flow-rate sensor measurements, fluid composition measurements such as salinity levels, other parameters relating to the formation of scale deposits, or any combination thereof). The sensor measurements may be directed by surface sensors, downhole sensors, or completion sensors to the transmitter subsystem 38 via any suitable telemetry (e.g., via electrical signals pulsed through the geological formation 16 or via mud pulse telemetry). In some embodiments, the transmitter subsystem 38 may receive inputs from a user interface (e.g., a graphical user interface) controlled by an operator. The transmitter subsystem 38 may process the sensor measurements and/or user inputs to determine a condition within the wellbore 14 or at the surface and determine whether to adjust the position of the valve 22 based on the condition of the wellbore 14 and/or the surface.

To this end, the transmitter subsystem 38 may be any electronic data processing system that can be used to carry out various functions of the systems and methods described herein. For example, the transmitter subsystem 38 may include a processor 40 which may execute instructions stored in memory 42 and/or storage 44. As such, the memory 42 and/or the storage 44 of the transmitter subsystem 38 may be any suitable article of manufacture that can store the instructions. In some embodiments, the memory 42 is a tangible, non-transitory, machine-readable-medium that may store machine-readable instructions for the processor 40 to execute. The memory 42 may include ROM, flash memory, a hard drive, or any other suitable optical, magnetic, or solid-state storage medium, or a combination thereof. The memory 42 may store data, instructions, and any other suitable data. Additionally, the transmitter subsystem 38 may include an input/output (I/O) port 46, which may include interfaces coupled to various components such as input devices (e.g., keyboard, mouse), input/output (I/O) modules, sensors (e.g., surface sensors and/or downhole sensors), and the like. For example, the I/O port 46 may include a display (e.g., an electronic display) that may provide a visualization, a well log, or other operating parameters of the geological formation 16, the wellbore 14, or the surface to an operator, for example. In this embodiment, the transmitter subsystem 38 (e.g., data processing system) has been represented at the well site. However, all or part of the transmitter subsystem 38 (e.g., all or part of the processor, the display, the memory, etc.) may be situated remotely from the well site and configured to communicate with the well site via a network connection. It should be noted that, at least in some instances, all or part of the data processing system may be cloud-based.

Figure 2:
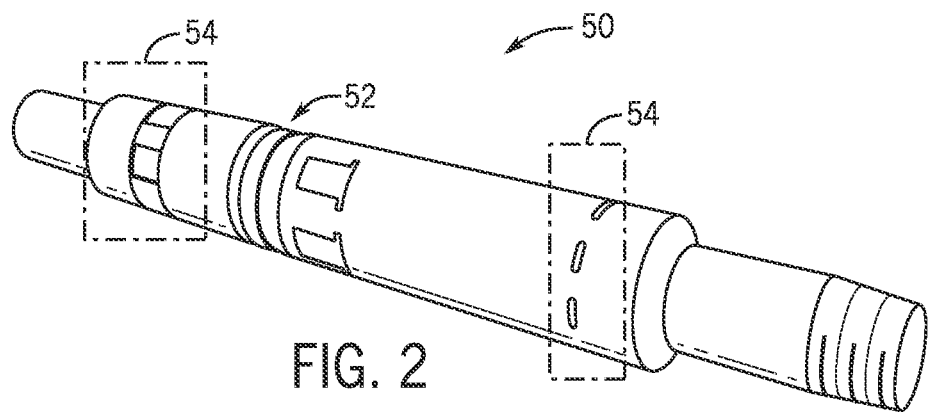
FIG. 2 is a perspective view of a packer tool having the smart sealing equipment.
Figure 3:
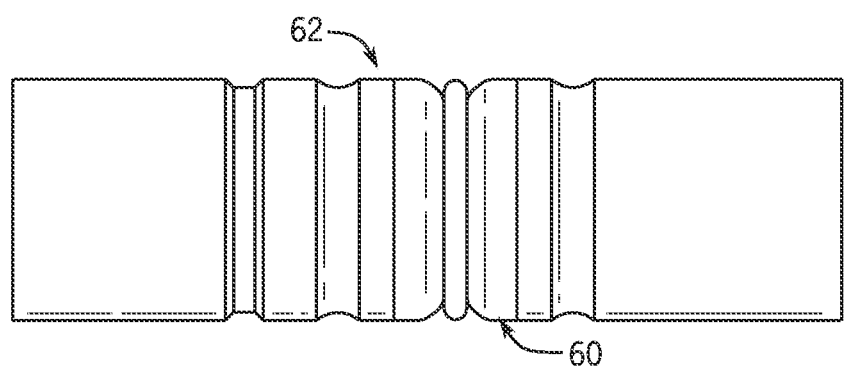
FIG. 3 is a perspective view of a bridge plug having the smart sealing equipment.

As described herein, it may be advantageous to provide one or more smart fluid sealing components, such as smart anti-extrusion elements and/or smart sealing elements, to the subterranean well system 10. FIGS. 2 and 3 show non-limiting examples of where the smart sealing equipment may be applied. For example, FIG. 2 shows a perspective view of a packer tool 50. For example, the packer element 52 may be treated as disclosed herein to form a smart fluid sealing component. Additionally, interior fluid conduits within the regions 54 (i.e., within the interior the packer tool 50) may include annular seals or o-rings that may be treated to form the smart fluid sealing component. FIG. 3 shows a perspective view of a bridge plug 60 where the smart sealing equipment may be applied. In a generally similar manner as described in FIG. 2, the plug sealing elements 62 may be treated as described herein to form smart fluid sealing components.

Figure 4:
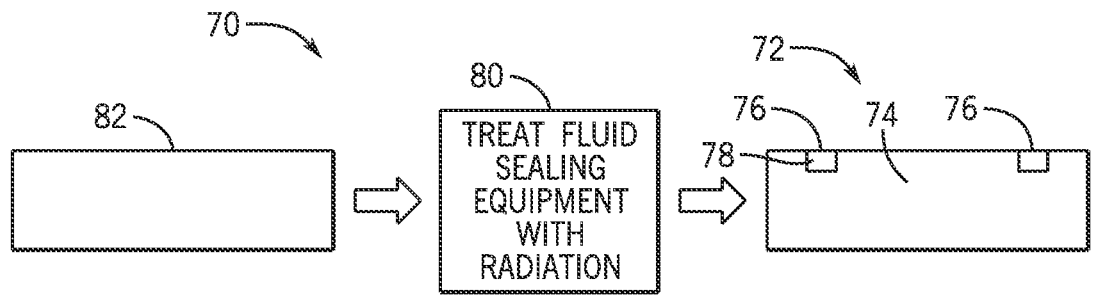
FIG. 4 is a flow diagram of an embodiment of a process for generating a smart fluid sealing element.

FIG. 4 is a flow diagram of a process 70 for producing a smart fluid sealing component 72 having a carbon-rich portion 74 that includes treated carbon regions 76 on an exterior surface of fluid sealing equipment. As generally described herein, the treated carbon region 76 (e.g., electrically active carbon region) includes one or more electrically conductive carbon materials 78. For example, the treated carbon region 76 may include one or more layers of electrically conductive carbon material 78 and/or an electrically conductive pattern (e.g., electric circuit) including the electrically conductive carbon materials 78.

At block 80, the process 70 includes treating fluid sealing equipment 82 to form the electrically conductive materials 78. In some embodiments, treating the fluid sealing equipment 82 may include depositing a conductive material (e.g., a metal) onto the carbon-rich polymer, thereby forming the electrically conductive region having a lower sheet resistance than the carbon-rich polymer. In some embodiments, treated the fluid sealing equipment 82 may include treating the fluid sealing equipment 82 with radiation or a focused energy source. In general, treating the fluid sealing equipment 82 with radiation may include providing a suitable exposure of the fluid sealing equipment 82 with a laser, thereby modifying or altering at least a portion of the carbon-rich portions 74 to produce an induced pattern or circuitry including electrically conductive materials 78 (e.g., electrically conductive carbon material and/or deposited metal). As referred to herein, an "induced circuitry" or "an induced pattern" refers to circuitry or pattern formed due to a modification (e.g., a chemical modification resulting from laser treatment) of a material. In general, the suitable exposure may include illuminating the fluid sealing equipment 82 at certain exposure parameters (e.g., a particular power or fraction (e.g., of the total power) of the laser (e.g., between 5 Watts (W) and 10 W, between 10 W and 15 W, between 15 W and 20 W, between 20 W and 25 W, or greater than 25 W, a wavelength of the emission of the laser within a suitable wavelength range (e.g., between 180 and 400 nm, between 400 and 700 nm, between 700 nm and 1100 nm), a pulse duration of width (e.g., between 1 ms and 10 ms, between 1 ns and 10 ns, between 5 fs and 100 ps) and scan rate between 1 mm/s and 6000 mm/s. In any case, providing the suitable exposure of the smart fluid sealing component 72 with the laser may generate the smart fluid sealing component 72 having one or more treated carbon regions 76 and an electrically conductive material 78. Focusing the laser beam on the surface of the carbon-rich portions 74 may form a pattern (e.g., an electric circuit) of the electrically conductive carbon by modifying the carbon content, thereby producing a different carbon species. It is presently recognized that tuning the exposure parameters may enable tuning of the carbon content and/or the thickness of the electrically conductive material 78.

In some embodiments, electrically conductive material 78 may be a metal or other conductive material. In such embodiments, the electrically conductive material 78 may be spray deposited onto the surface of the smart fluid sealing component 72 (i.e., onto the carbon-rich polymer/material surface).

In some embodiments, treating the coating, at block 80, may include creating one or more interconnects between a conductive pattern, engraved circuitry, or printed circuitry by depositing a conductive metal (e.g., copper, gold, silver) and/or applying an electrically conductive anchoring element, thereby forming a material acting as a pad. At least in some instances, creating the interconnects and treating the coating may be performed in a single similar chamber, such as a plasma vapor deposition (PVD) chamber, a chemical vapor deposition (CVD), or a plasma-assisted or enhanced chemical vapor deposition (PACVD, PECVD) chamber.

Figure 5:
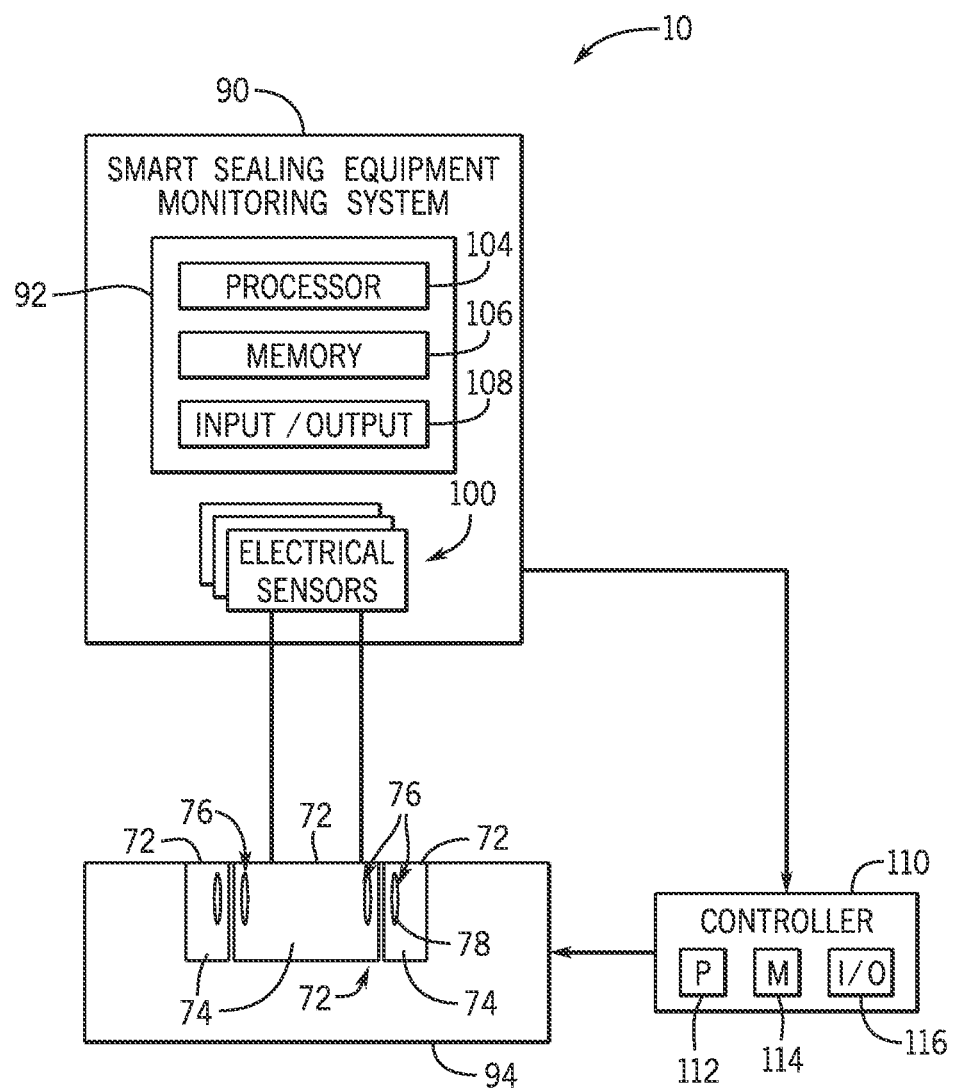
FIG. 5 is a block diagram of an embodiment of a smart sealing equipment monitoring system.

As described herein, it may be advantageous to detect expansion or deformation of the sealing element by measuring a pressure applied by a sealing element to a surface (e.g., an inner surface of an anti-extrusion element), which may indicate that the sealing element is extruding. To illustrate an example of these techniques, FIG. 5 is a diagram of an embodiment of a smart sealing element monitoring system 90 that detects a change in the electrical properties of a smart fluid sealing component 72 that results from deformation of an elastomer component.

In certain embodiments, the smart fluid sealing component 72 is generally a carbon-rich material having mechanical properties, such as one or more of heat resistance, mechanical strength, rigidity, chemical stability, self-lubrication, or any combination thereof, suitable for maintaining the structure of the material coating during certain oil and gas operations described herein. In some embodiments, the smart fluid sealing component 72 may be at least partially or entirely made of a carbon-rich polymer, a polymer composite, a metallized polymeric composite, or a combination thereof. For example, the smart fluid sealing component 72 may be made of an engineering polymer, such as one or more of polyether ether ketone (PEEK), polyetherketone (PEK), other polyaryletherketone (PAEK) polymers, polyphenylene sulfide (PPS), nylon polymers, epoxy polymers, or other carbon-rich engineering polymers.

The smart fluid sealing component 72 may be an elastomer component that may expand a suitable amount to form a seal to physical couple to a machine component 94 of a subterranean well system 10. For example, the elastomer component may be compressed axially to cause radial expansion, the elastomer component may be coupled to a tapered interface to cause radial expansion, or other techniques as may be understood by a person of ordinary skill in the art. In general, the machine component 94 may be fluid system equipment such conduits, valves, and the like, the subterranean well system 10.

The smart fluid sealing component 72 includes treated carbon regions 76 that is an electrically conductive carbon region formed of electrically conductive materials 78. In general, the treated carbon region 76 is more electrically conductive (e.g., has a lower sheet electrical resistance) than the untreated carbon-rich portions 74 of the smart fluid sealing component 72. For example, in certain embodiments, the sheet electrical resistance of the untreated carbon-rich portions 74 may be more than 100 times (i.e., 2 orders of magnitude), more than 250 times, more than 500 times, or more than 1000 times (i.e., 3 orders of magnitude), than the sheet electrical resistance of the treated carbon region 76. Put differently, the sheet electrical resistance of the treated carbon region 76 may be less than $\frac{1}{100}^{th}$, than that of the sheet electrical resistance of the untreated carbon-rich portions 74 of the smart fluid sealing component 72. Additionally, in certain embodiments, the treated carbon region 76 may have a relatively low sheet electrical resistance (e.g., less than 1000Ω per sq.), or a combination thereof, as compared to the untreated carbon-rich portion 74 of the smart fluid sealing component 72. While the discussion above relates to treated carbon regions 76 that include electrically conductive materials 78, it should be noted that the above discussion may also apply to electrically conductive materials 78 deposited onto the surface of the smart fluid sealing component 72.

The treated carbon regions 76 may include an electrically conductive pattern (e.g., electric circuit) that includes the electrically conductive materials 78. The electrically conductive pattern may be utilized as a sensing substrate that is capable of detection a presence of stress applied to the surface of the smart fluid sealing component 72, such as an electric circuit (e.g., printed circuitry). In this way, the smart fluid sealing component 72 may enable detection of exposure of the downhole components to force, pressure, stress, or strain that produce a mechanical change to the treated carbon region 76 that are detectable via measuring electrical properties of the treated carbon region 76. In some embodiments, the presence of a fluid (e.g., a leaked fluid) may change the electrical properties of the treated carbon region 76. In some embodiments, the treated carbon regions 76 may be formed on multiple regions of the smart fluid sealing component 72. Accordingly, a profile of force along a seal interface may be measured by determining the change in electrical properties across each of the treated carbon regions 76. Accordingly, a specific type of force may be detected, such as an axial force, a radial force, a circumferential force, and the like.

In some embodiments, the smart fluid sealing component 72 may include a suitable amount of the electrically conductive material 78 such that the sheet electrical resistance (Rs) in Ohms per square (Ω per sq.) of the smart fluid sealing component 72 is less than 1000Ω per sq. For example, the suitable amount of the electrically conductive material 78 may be such that the Rs of the smart fluid sealing component 72 is between approximately 10 to 1000Ω per sq., 20Ω per sq. to 500Ω per sq., 30Ω per sq. to 250Ω per sq., 40Ω per sq. to 200Ω per sq., 50-150Ω per sq.

The electrically conductive material 78 is generally a modified portion of the surface material within the untreated carbon-rich portion 74 (e.g., by chemically altering the carbon-rich polymer via laser ablation and/or spray depositing of metal). In some embodiments, the electrically conductive materials 78 may include graphene, graphite, and other types of electrically conductive materials. In some instances, the treated carbon region 76 may include a portion of the electrically conductive material 78, such as one or more underlying layers of a less conductive carbon material or intervening portions of the less conductive carbon material in between any patterns (e.g., patterns formed of the electrically conductive material 78, such as an electric circuit or a sensing circuit) included in the treated carbon region 76. That is, the treated carbon region 76 may include an area of a surface of the smart fluid sealing component 72 where less than 30%, less than 20%, less than 15%, less than 10%, or less than 5% of the area includes the electrically conductive material 78 and greater than 70%, greater than 80%, greater than 85%, greater than 90%, or greater than 95% of the area is the untransformed, carbon material (e.g., elastomer or engineering polymer). It should be noted that the treated carbon region 76 may include any suitable percent area and/or volume of the electrically conductive material 78, such that the treated carbon region 76 is conductive (e.g., the treated carbon region 76 and/or the smart fluid sealing component 72 having a sheet electrical resistance that is less than 2000Ω per sq. or less than 1000Ω per sq.), as described above. For example, the treated carbon region 76 may include 0.01% by area or volume of the electrically conductive material 78 and 99.99% by area of volume of the untreated carbon-rich portion 74, 0.1% by area or volume of the electrically conductive material 78 and 99.9% by area of volume of the untreated carbon region 74, 1% by area or volume of the electrically conductive material 78 and 99% by area of volume of the carbon-rich portion 74, 10% by area or volume of the electrically conductive material 78 and 90% by area of volume of the untreated carbon-rich portion 74 among others.

The sealing element monitoring system 90 includes one or more electrical sensors 100 that measure or detect the change in the electrical properties of the electrically conductive material 78 due to strain or stress applied by or to the smart fluid sealing component 72. It should be noted that although the electrical sensors 100 in the illustrated embodiment are electrically coupled to one treated carbon-rich portions 76, the electrical sensors, in other embodiments, may be coupled to multiple treated carbon regions 76. In any case, the sensor data (e.g., generated by the electrical sensors 100) may be output to a computing device 102 (e.g., computer or processor-based machine) having a processor 104, which may execute instructions stored in memory 106 and/or storage media, or based on inputs provided from a user via the input/output (I/O) device 108. The memory 106 and/or the storage media may be read-only memory (ROM), random-access memory (RAM), flash memory, an optical storage medium, or a hard disk drive, to name but a few examples. For example, in operation, the processor 104 may receive sensor data, determine that the electrical properties of the smart fluid sealing component 72 have changed above a threshold a potential of extrusion of a sealing element, and send an alert or suitable control signals to take a corrective action.

For example, the processor 104 of the computing device 102 may output the alert of control signal to a controller 110 having a processor 112, a memory 114, and an I/O device 116. In general, the processor 112 may include similar features as described with respect to the processor 104. The memory 114 may include similar features as described with respect to the memory 106. The I/O device 116 may include similar features as described with respect to the I/O device 108. In general, the controller 110 may be capable of taking a correction action, such as controlling a valve to close, or otherwise halting operation of downhole equipment (e.g., a downhole component including the packer tool 50, the bridge plug 60, or other downhole fluid equipment) of the subterranean well system 10.

As described herein, it may be advantageous to form treated carbon region 76 on a particular portion of the smart fluid sealing component 72. To illustrate examples of regions to form the electrically conductive regions in one embodiment of the smart fluid sealing component 72, FIG. 6 is a cross-sectional view of a smart fluid sealing component 72. In the illustrated embodiment, the smart fluid sealing component 72 is a sealing element, such as an annular seal or o-ring (e.g., elastomeric o-ring), a packer element, a back-up ring (e.g., thermoplastics back-up ring), and the like. In general, the smart fluid sealing component 72 is an annular component that may be arranged around a downhole component, such as the packer tool 50. For example, the smart fluid sealing component 72 may be annular about the longitudinal axis 123 corresponding to the length along a downhole component, depth of a wellbore 14, length of the closure device 12, and the like. Accordingly, the smart fluid sealing component extends in about a circumference of a downhole component, such as a packer component.

In the illustrated embodiment, the treated carbon regions 74 are formed on the outer surfaces 120 of the smart fluid sealing component 72. In general, the outer surface 120 is the surface of the smart fluid sealing component 72 that is coupled to the inner surface 122 of the component 94. As shown, the smart fluid sealing component 72 includes two treated carbon regions 76. However, in other embodiments, the smart fluid sealing component 72 may include more than two or fewer than two treated carbon regions 76. For example, the smart fluid sealing component 72 may include one, three, four five, six, or more than six treated carbon regions 76.

In operation, in an embodiment where the smart fluid sealing component 72 is a sealing element, the smart fluid sealing component 72 may deform or otherwise expand radially outwards from the longitudinal axis, which may alter the amount of force applied to the inner surface 122 (e.g., an inner annular surface) of the component 94. For example, the smart fluid sealing component 72 may degrade due to gradual exposure to chemical constituents, such as hydrogen sulfide, super critical carbon dioxide, acids, bases, and other chemical constituents as described in that may degrade the sealing component). Accordingly, the degradation may alter the seal, thereby modifying the force applied to a surface contacting the smart fluid sealing component 72 (e.g., an inner surface of a casing). As the smart fluid sealing component 72 degrades or expands, the force applied to the treated carbon regions 76 of the smart fluid sealing component 72 decreases or increases. The force applied to the treated carbon regions 76 produces a change in the electrical properties of the treated carbon regions 76 that may be detectable by the electrical sensors 100 described in FIG. 5. For example, the electrical sensors 100 may disposed inside or outside of a component 94, such as within the regions 54 as described in FIG. 2, or other locations or regions where stress may occur. Accordingly, sealing element monitoring system 90 may be capable of detecting a change in the electrical property indicative of the smart fluid sealing component 72 expanding before it extrudes or during extrusion. In this way, an operator may monitor the condition of the smart fluid sealing component 72 and/or a likelihood of extrusion of a sealing element.

FIG. 7 is a cross-sectional view of a component 94 coupled to a smart fluid sealing component 72 that is an anti-extrusion element. In the illustrated embodiment, the treated carbon regions 76 are formed on the inner surface 124 of the smart fluid sealing component 72a, 72b (e.g., collectively 72). In general, the inner surface 124 of smart fluid sealing component 72 is the side of the smart fluid sealing component 72 that contacts a sealing element 126 (e.g., a sealing element that does not include treated carbon regions 76).

In operation, the sealing element 126 may expand radially outwards from the longitudinal axis, which may alter the amount of force applied to the inner surface 124 of the smart fluid sealing component 72. As the sealing element 126 expands, the force applied to the treated carbon regions 76 of the smart fluid sealing component 72 increases. The force applied to the treated carbon regions 76 produces a change in the electrical properties of the treated carbon regions 76 that may be detectable by the electrical sensors 100 described in FIG. 5. Accordingly, sealing element monitoring system 90 may be capable of detecting a change in the electrical property indicative of the sealing element 126 expanding before it extrudes or during extrusion. In this way, an operator may monitor the condition of the sealing element 126 and/or a likelihood of extrusion.

It should be noted that while only one anti-extrusion element (i.e., the smart fluid sealing component 72 of FIG. 7) is shown, multiple smart fluid sealing component 72 may be used. For example, multiple anti-extrusion elements such as back-up rings may be provided. In some embodiments, each of the anti-extrusion elements may be formed of different materials, such as PEEK 5000G, PEEK 450G, graphite-PTFE composite, glass-PTFE composite, or a combination thereof.

In some embodiments, the smart fluid sealing component 72 may include both smart sealing elements and smart anti-extrusion elements. FIG. 8 is a cross-sectional view of a component 94 sealed with smart fluid sealing component 72a, 72b that are anti-extrusion elements and a smart fluid sealing component 72c that is a sealing element. In a generally similar manner as described in FIG. 6, the treated carbon regions 74 are formed on the outer surfaces 120 of the smart fluid sealing component 72. In a generally similar manner as described in FIG. 7, the treated carbon regions 74 are formed on the inner surface 124 of the smart fluid sealing component 72a, 72b. In general, the fluid sealing components 72a, 72b and 72c are arranged in a concentric arrangement. Accordingly, in operation, as the smart fluid sealing component 72c (i.e., the smart sealing element) expands, the force applied to the treated carbon regions 74 of the smart fluid sealing component 72a, 72b, and 72c increases. The force applied to the treated carbon regions 74 produces a change in the electrical properties of the treated carbon regions 74 that may be detectable by the electrical sensors 100 described in FIG. 5. Accordingly, sealing element monitoring system 90 may be capable of detecting a change in the electrical property indicative of the sealing element (i.e., the smart fluid sealing component 72c) expanding before it extrudes or during extrusion. In this way, an operator may monitor the condition of a sealing element and/or a likelihood of extrusion.

In the example above, the smart fluid sealing components 72 generally have similar shapes. For example, the smart anti-extrusion element and/or smart sealing element may both be annular or cylindrical or otherwise have complementary surfaces (e.g., annular surfaces) that physically coupled together (e.g., annular sealing interface). However, in some embodiments, the smart anti-extrusion element and/or smart sealing element may have substantially different shapes.

As described herein, it may be advantageous to form the treated carbon regions 74 on a particular portion of the surface of the smart fluid sealing component 72. To illustrate this, FIG. 9 shows an image depicting strain on an anti-extrusion element 128 by the sealing element 126. In general, increasing strain corresponds with a lighter color grey. As shown, the sealing element 126 applies relatively more force to the anti-extrusion element 128 along a slope portion 130 of a concave shape. Accordingly, it may be advantageous to form the treated carbon portions along the slope portion 130. In general, the slope portion 130 runs along the seal interface between the anti-extrusion element 128 and the sealing element 126. In some embodiments, the slope portion 130 may be substantially wedged-shaped, thereby forming an annular wedge-shaped portion. The anti-extrusion element may include a complementary surface to the wedge-shaped portion, such as a female receptacle to the male wedge portion. In general, the treated carbon portions 74 may be formed along the seal interface. For example, the treated carbon portions may be disposed within a first 25% of the surface, between 10-25%, between 20-40%. In this way, the electrically sensitive portion of a smart fluid sealing component 72 may be more likely to detect a change in force or strain indicative of potential extrusion.

While the discussion above relates to treated carbon regions 76 that include electrically conductive materials 78, it should be noted that the above discussion may also apply to electrically conductive materials 78 deposited onto the surface of the smart fluid sealing component 72. For example, the smart fluid sealing component 72 may include treated carbon regions 76 formed by depositing a conductive material onto the carbon-rich polymer or material.

Figure 10:
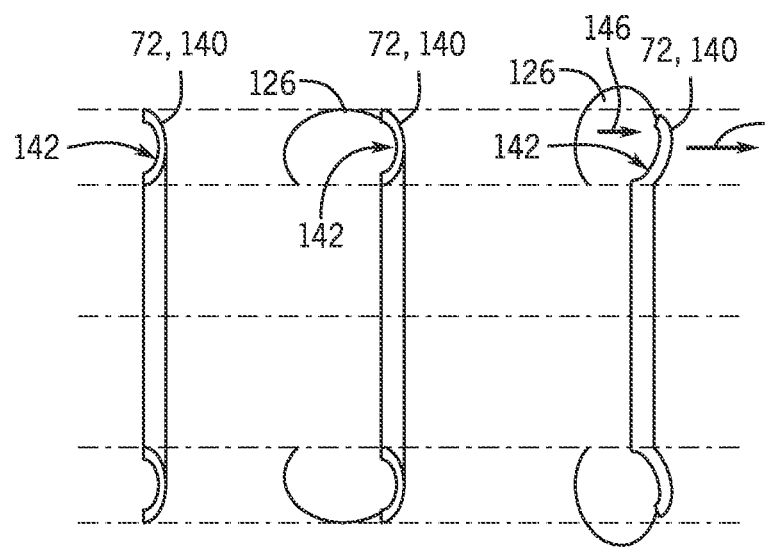
FIG. 10 is a cross sectional view and a top-down aerial of an embodiment of smart sealing equipment with multiple treated carbon regions.

As one specific example of the smart fluid sealing component 72, FIG. 10 shows a schematic diagram of a smart fluid sealing component 72 that is a fold back ring 140. In particular, FIG. 10 shows a cross-sectional view of an annular shaped smart fluid sealing component 72. In the illustrated embodiment, the fold back ring 140 has a curved interior shape 142 that may receive the sealing element 126. As the sealing element 126 expands due to external pressure or other sources of deformation, the sealing element 126 applies a force to the curved interior shape 142 of the fold back ring 140. The fold back ring 140 may be suitably pliable such that it bends in an outward radial direction 146. Accordingly, it may be advantageous to form treated carbon regions 74 along the curved interior shape 142.

Figure 11:
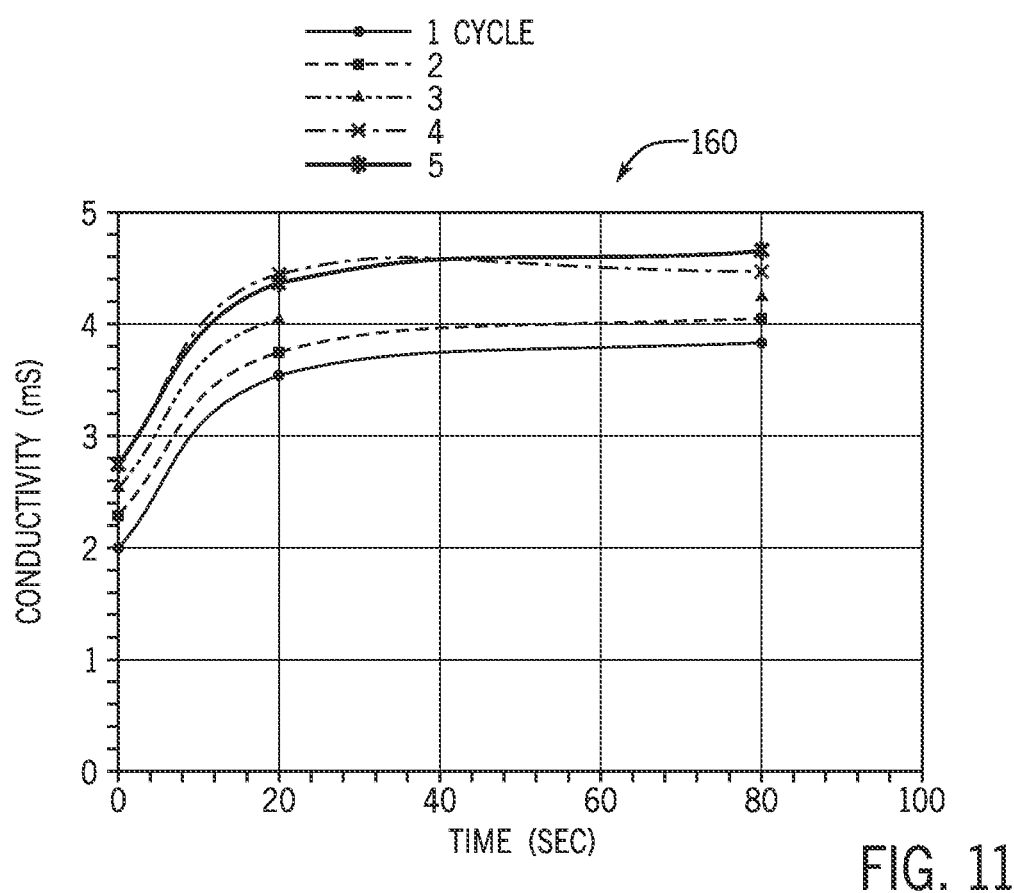
FIG. 11 is a graph showing a measured conductivity versus time.

FIG. 11 is a graph 160 showing a measured conductivity (e.g., the y-axis) of a smart fluid sealing component 72 versus a pressure applied (e.g., the x-axis) to a smart fluid sealing component 72. More specifically, the graph 160 shows the conductivity changes for different cycles of loads (e.g., a first applied load '1 cycle', a second applied load '2', a third applied load '3', and so on) that produce changes in the viscoelasticity of the smart fluid sealing component 72. In general, the graph 160 shows a quasi-linear change of conductivity during a time scale of 20 seconds. Accordingly, a measured electrical property may be used to determine whether the smart fluid sealing component 72 is subject to a mechanical load, and changes in in conductivity can correlate (e.g., directly correlate) to expansion and/or potential extrusion of a sealing element.

Figure 12:
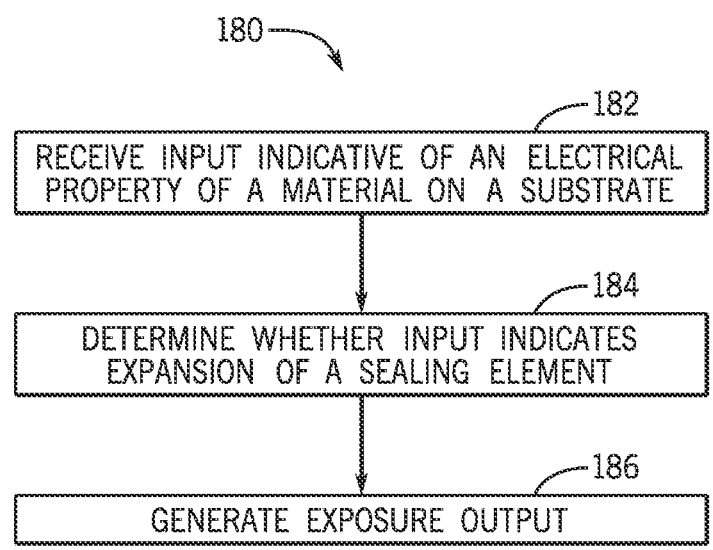
FIG. 12 is a flow diagram of an embodiment of a process for generating a machine component damage output based on a change in electrical properties, mechanical properties, or both, of a smart carbon coating.

To illustrate operation of the embodiments of components of the smart sealing element monitoring system 90 described in FIG. 4, FIG. 12 illustrates an embodiment of a process 180 for generating an extrusion detection output, such as an alert or a control signal to modify operation of components of a subterranean well system 10. Although the process 180 is described as being performed by the computing device 92, any suitable machine or processor-based device capable of communicating with other components of the smart sealing element monitoring system 90 may perform the disclosed process 180 including, but not limited to, the controller 110, and the like.

At block 182, the smart sealing element monitoring system 90 may acquire property data using the electrical sensors 100. For example, the smart sealing element monitoring system 90 may activate electrodes to cause the electrodes of the smart sealing element monitoring system 90 to induce a current (e.g., by applying a voltage) across the smart fluid sealing component 72. In turn, the smart sealing element monitoring system 90 may acquire data indicative of the electrical property of smart fluid sealing component 72 based on the current provided to the smart fluid sealing component 72. For example, the smart sealing element monitoring system 90 may determine a magnitude of the change in the electrical property (e.g., based on a relative change). At block 184, the smart sealing element monitoring system 90 may detect exposure of a sealing element 126 to fluids (e.g., chemical constituents such as hydrogen sulfide, acids, bases, and other chemical constituents as described herein), a stress (e.g., stress exceeding a threshold) on the sealing element 126, an expansion beyond a threshold of the sealing element 126, a decrease in the force applied to the smart fluid sealing component 72, a pressure induced by fluids or a solid material, based on the electrical property data. In some embodiments, the smart sealing element monitoring system 90 may determine whether the sealing element 126 needs maintenance, or needs to be replaced, based on the electrical property data. For example, the smart sealing element monitoring system 90 may determine a change in resistance, conductivity, and/or other properties as discussed herein, indicative of expansion, potential extrusion, decomposition, or a combination thereof, of a sealing element 126 and/or a smart fluid sealing component 72. In general, the smart sealing element monitoring system 90 may compare the measured electrical property (i.e., or change in the electrical property from a previously measured electrical property) to a threshold or threshold range (i.e., change threshold) and determine whether the electrical property exceeds a threshold or is within or outside of the threshold range.

At block 186, the smart sealing element monitoring system 90 may generate an extrusion output. In general, the extrusion output may include an audible and/or visual alert (e.g., a notification displayed on a computing device, such as a laptop, mobile device, tablet, or otherwise) or cause a component of the subterranean well system 10 to modify operation. For example, the damage output may be a control signal or activation signal that causes a device utilizing the smart fluid sealing component 72 to stop operating or change operation or position. As another non-limiting example, the control signal may cause a drill to stop drilling, a valve to open or close, and/or a fluid flow rate to change. In some embodiments, the damage output may be an indication or alert displayed on a computing device, indicating a likelihood that a sealing element 126 and/or the smart fluid sealing component 72 may extrude. In some embodiments, the notification may indicate a magnitude of the exposure to fluids, material or otherwise that includes a mechanical change of a sealing element 126 and/or smart fluid sealing component 72 (e.g. based on the change in the electrical properties). For example, the alert may warn a user that a sealing element 126 was likely damaged as well as the extent of the damage (e.g., determined based on a magnitude change or the location of the change in electrical properties) and/or a time period when the sealing element 126 was likely damaged. In some embodiments, the smart sealing element monitoring system 90 may determine an estimated time period for subsequent use of the smart fluid sealing component 72, a sealing element 126, and/or a mechanical component including the smart fluid sealing component 72 prior to inspection, repair, or replacement. For example, the smart sealing element monitoring system 90 may use a reference table (e.g., storing relationships between a magnitude of exposure and a time for replacement or maintenance) stored in a memory and the magnitude of the exposure to determine the estimate time period. As such, the smart sealing element monitoring system 90 may include the estimated time period in the notification or alert.

This written description uses examples to disclose the subject matter, including the best mode, and also to enable any person skilled in the art to practice the subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a fluid sealing component comprising:
  a body comprising a carbon-rich material, wherein a portion of an exterior surface of the body comprises an untreated non-conductive carbon region, and wherein a remainder of the exterior surface comprises multiple treated carbon regions;
  wherein each treated carbon region comprises an electrically conductive material with a sheet electrical resistance less than 1/100 of a sheet electrical resistance of the untreated non-conductive carbon region, and wherein the multiple treated carbon regions together comprise less than 30% of the exterior surface.

2. The system of claim 1, wherein the fluid sealing component comprises an anti-extrusion element.

3. The system of claim 1, wherein the fluid sealing component comprises an elastomer sealing element.

4. The system of claim 1, wherein the electrically conductive material comprises a deposited metal layer.

5. The system of claim 1, wherein the fluid sealing component comprises at least one of a packer element, a bridge plug, or an o-ring.

6. The system of claim 1, wherein the electrically conductive material comprises electrically conductive carbon.

7. The system of claim 1, wherein the sheet electrical resistance of each treated carbon region is less than 1000Ω per sq.

8. The system of claim 1, wherein each treated carbon region comprises an electric circuit formed of the electrically conductive material, wherein the electric circuit is configured to produce a detectable change in an electrical property due to stresses applied to or resulting in the treated carbon region.

9. The system of claim 1, wherein the carbon-rich material comprises polyether ether ketone (PEEK), polyetherketone (PEK), other polyaryletherketone (PAEK) polymers, polyphenylene sulfide (PPS), nylon polymers, epoxy polymers, or any combination thereof.

10. The system of claim 1, wherein each treated carbon region comprises 0.1% by area of the electrically conductive material.

11. The system of claim 1, wherein each treated carbon region comprises layers of electrically conductive carbon material wherein the layers of electrically conductive carbon material form patterns in the treated carbon region.

12. A system, comprising:
a fluid sealing equipment monitoring system configured to measure data indicative of a change in one or more electrical properties of a carbon-rich material;
a fluid sealing component comprising the carbon-rich material, wherein the carbon-rich material comprises:
  an untreated carbon-rich material region that is non-conductive on a portion of an exterior surface of the fluid sealing component; and
  multiple treated carbon-rich material regions on a remainder of the exterior surface that have been superficially transformed to become electrically conductive material though a formation of graphene and an addition of a metallic component, wherein the treated carbon-rich material regions together comprise less than 30% of the exterior surface, and wherein each treated carbon-rich material region comprises a sheet electrical resistance less than 1/100 of the sheet electrical resistance of the untreated carbon-rich material region; and
a non-transitory machine-readable medium and executable by a processor to:
  identify the change in an electrical property of the fluid sealing component in response to the data; and
  output an indication of the change.

13. The system of claim 12, wherein the fluid sealing component comprises a curved interior shape.

14. The system of claim 13, where the fluid sealing component comprises an annular structure.

15. The system of claim 12, wherein the sheet electrical resistance of each treated carbon region is less than 1000Ω per sq.

16. A system comprising:
an annular sealing element comprising an elastomer material; and
an annular anti-extrusion element comprising a carbon-rich material, the carbon-rich material comprising:
  multiple treated carbon regions formed on respective portions of an exterior surface of the annular anti-extrusion element where the treated carbon regions together comprise less than 30% of the exterior surface and have a first electrical sheet resistance; and an untreated carbon region on a remainder of the exterior surface that is non-conductive having a second sheet resistance, wherein the first electrical sheet resistance is less than 1/100 of the second sheet resistance.

17. The system of claim 16, wherein an inner surface of the annular anti-extrusion element is coupled to the annular sealing element.

18. The system of claim 17, wherein the inner surface of the anti-extrusion element has a concave shape.

19. The system of claim 16, wherein the carbon-rich material comprises polyether ether ketone (PEEK), polyetherketone (PEK), other polyaryletherketone (PAEK) polymers, polyphenylene sulfide (PPS), nylon polymers, epoxy polymers, or any combination thereof.

20. The system of claim 16, wherein the annular anti-extrusion element comprises a fold-back ring.

* * * * *